United States Patent
Gimpl et al.

(10) Patent No.: US 8,055,733 B2
(45) Date of Patent: Nov. 8, 2011

(54) METHOD, APPARATUS, AND COMPUTER PROGRAM PRODUCT FOR IMPLEMENTING IMPORTATION AND CONVERGING SYSTEM DEFINITIONS DURING PLANNING PHASE FOR LOGICAL PARTITION (LPAR) SYSTEMS

(75) Inventors: David J. Gimpl, Rochester, MN (US);
Cale T. Rath, Byron, MN (US);
Devaughn Lawrence Rackham, Rochester, MN (US); George James Romano, Rochester, MN (US); Tammy Lynn Van Hove, Elgin, MN (US)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 11/873,561

(22) Filed: Oct. 17, 2007

(65) Prior Publication Data
US 2009/0105999 A1 Apr. 23, 2009

(51) Int. Cl.
*G06F 15/177* (2006.01)
(52) U.S. Cl. ............ 709/220; 709/223; 718/1; 718/100; 718/104
(58) Field of Classification Search .............. 709/220, 709/223
See application file for complete search history.

(56) References Cited

U.S. PATENT DOCUMENTS

| | | | |
|---|---|---|---|
| 4,939,507 A | 7/1990 | Beard et al. | |
| 5,345,590 A * | 9/1994 | Ault et al. ........................ | 718/1 |
| 5,761,664 A | 6/1998 | Sayah et al. | |
| 6,654,756 B1 | 11/2003 | Quernemoen et al. | |
| 6,868,070 B1 | 3/2005 | Alves et al. | |
| 7,065,761 B2 * | 6/2006 | Foster et al. .................. | 718/100 |
| 7,395,403 B2 | 7/2008 | Hintermeister et al. | |
| 2003/0046479 A1 | 3/2003 | Noble et al. | |
| 2003/0097545 A1 | 5/2003 | Vadavia | |
| 2003/0131042 A1 * | 7/2003 | Awada et al. .................. | 709/104 |
| 2003/0145122 A1 * | 7/2003 | Banerjee et al. .............. | 709/250 |
| 2004/0003063 A1 | 1/2004 | Ashok et al. | |
| 2004/0044825 A1 | 3/2004 | Fisher et al. | |
| 2004/0143664 A1 | 7/2004 | Usa et al. | |
| 2004/0153853 A1 | 8/2004 | Moriki et al. | |
| 2004/0205776 A1 | 10/2004 | Harrington et al. | |
| 2004/0210554 A1 | 10/2004 | Oliver et al. | |
| 2004/0210734 A1 | 10/2004 | Abbey | |
| 2004/0221290 A1 | 11/2004 | Casey et al. | |
| 2005/0022200 A1 | 1/2005 | Abbey et al. | |

(Continued)

OTHER PUBLICATIONS

"Performance Management and Capacity Planning Solutions for the Enterprise", http://www.hyperformix.com, Jun. 9, 2005.

*Primary Examiner* — Michael Won
(74) *Attorney, Agent, or Firm* — Joan Pennington (57) ABSTRACT

Hardware and partition information of an existing LPAR system is collected and stored in a first system plan file. The first system plan file is applied to a partition planning tool. The partition planning tool identifies hardware to be reused in a second LPAR system and filters hardware to be excluded from the second LPAR system. The partition planning tool creates a plan for the second LPAR system using the identified hardware to be reused and the partition information. The created plan for the second LPAR system is applied to a partition deployment tool to partition the second LPAR system. The created plan for the second LPAR system is used to move and place hardware to be reused in the second LPAR system.

20 Claims, 11 Drawing Sheets

U.S. PATENT DOCUMENTS

| | | |
|---|---|---|
| 2005/0027661 A1 | 2/2005 | Lober et al. |
| 2005/0044228 A1 | 2/2005 | Birkestrand et al. |
| 2005/0055590 A1 | 3/2005 | Farkas et al. |
| 2005/0071446 A1 | 3/2005 | Graham et al. |
| 2005/0192781 A1 | 9/2005 | Deltch |
| 2005/0257020 A1 | 11/2005 | Kashyap et al. |
| 2006/0095708 A1 | 5/2006 | Sater et al. |
| 2006/0136761 A1 | 6/2006 | Frasier et al. |
| 2006/0174007 A1 | 8/2006 | Birkestrand |
| 2007/0038836 A1 | 2/2007 | Hintermeister et al. |
| 2007/0067433 A1* | 3/2007 | D'Alterio et al. ............. 709/223 |
| 2009/0105999 A1* | 4/2009 | Gimpl et al. ..................... 703/6 |

* cited by examiner

METHOD, APPARATUS, AND COMPUTER PROGRAM PRODUCT FOR IMPLEMENTING IMPORTATION AND CONVERGING SYSTEM DEFINITIONS DURING PLANNING PHASE FOR LOGICAL PARTITION (LPAR) SYSTEMS

FIELD OF THE INVENTION

The present invention relates generally to the data processing field, and more particularly, relates to a method, apparatus, and computer program product for implementing importation and converging system definitions during planning phase for logical partition (LPAR) systems.

DESCRIPTION OF THE RELATED ART

LPAR solutions can be planned with sophisticated partition planning tools. These planning tools can configure and simulate the rules of complex hardware environments.

Partition planning tools enable specific system hardware to be modeled to allow accurate validation of a proposed partition configuration on a precise configuration of system hardware. The planning tool can represent the system and validate the partition layout, the resulting validated system hardware and partition plan can then be used to build the modeled system and deploy the planned partitions when that system is manufactured.

U.S. patent application Ser. No. 11/421,329 filed May 31, 2006 to David J. Gimpl et al., entitled Method, Apparatus, And Computer Program Product For Implementing Plans For Logical Partition (LPAR) Systems, and assigned to the present assignee discloses a method, apparatus and computer program product for implementing plans for logical partition (LPAR) systems that includes the generation of a representation of existing hardware and LPAR configuration of a system that is used as input for further LPAR planning and configuration modeling to enable producing accurate and valid plans for possible deployment.

The existing system is surveyed and the representation of existing hardware and LPAR configuration of the system is generated. The representation is applied to a partition planning tool and used to create a plan for the LPAR system.

For existing partitioned systems, both the partitions that are supported on those systems and the hardware used, inevitably need to be migrated to new systems as more advanced processor and memory technology emerges. Partitioning technology allows for more flexible migration and consolidation but that means that partitions on existing systems have to be moved to new or existing systems capable of hosting them.

At times existing system hardware resources, such as, expansion units, PCI cards, devices, disk storage, and the like, that provide the resources for existing partitions also need to be moved to compatible hardware so that these resources can continue to be used by a partition that is also being moved or just moved to allow partitions on that system to take advantage of these resources. This could happen as part of a system upgrade or consolidation of existing partitions and resources to new or existing systems. In addition this can happen when existing hardware is moved or reused when upgrading systems to newer models even if the partitions themselves are not moved or reused.

The planning and deployment actions required to migrate an existing partition and possibly its hardware to an existing system is a very complex problem as is planning for a system upgrade that uses some of the existing systems resources but has to support all its existing partitions. When moving an existing partition it possibly has system hardware resources that are required and might have dependencies on other partitions as well, for example, through virtual connections. Trying to figure out if existing hardware can be employed as part of migrating that partition to another system or if that partition can be supported on new or existing system hardware is challenging.

Trying to determine if existing hardware could be moved or reused as part of moving that hardware or as part of a system upgrade is itself a complex problem. Some of that hardware may not be compatible with the system where it is being moved. If cards or drives are moved, the cards or drives have valid placement rules that have to be followed for the cards or drives to work when moved to a new system. Typically there is no planning or validation that the existing hardware resources or partitions that are moved to a new system were correctly migrated and are valid configurations which will work on the new system according to plan after they were moved.

All these problems mean that customer actions, such as system upgrades or using partitioning as a means to support system consolidation are far more difficult and will become more difficult as more partitioned environments are defined and used. This can lead to customers being reluctant or delaying system upgrades, or the upgrades being generally a trial and error exercise.

A need exists for effective mechanism for implementing importation and converging system definitions during planning phase for logical partition (LPAR) systems.

SUMMARY OF THE INVENTION

Principal aspects of the present invention are to provide a method, apparatus, and computer program product for implementing importation and converging system definitions during planning phase for logical partition (LPAR) systems. Other important aspects of the present invention are to provide such method, apparatus, and computer program product for implementing importation and converging system definitions during planning phase for logical partition (LPAR) systems substantially without negative effect and that overcome many of the disadvantages of prior art arrangements.

In brief, a method, apparatus, and computer program product are provided for implementing importation and converging system definitions during planning phase for logical partition (LPAR) systems. Hardware and partition information of an existing LPAR system is collected and stored in a first system plan file. The first system plan file is applied to a partition planning tool. The partition planning tool identifies hardware to be reused in a second LPAR system and filters hardware to be excluded from the second LPAR system. The partition planning tool creates a plan for the second LPAR system using the identified hardware to be reused. When creating the plan for the second LPAR system, the partition planning tool also uses information of the partitions of the existing LPAR system and identifies partitions to be supported on the second LPAR system, and validates hardware using predefined placement rules. The created plan for the second LPAR system is applied to a partition deployment tool to partition the second LPAR system; the created plan for the second LPAR system used to move and place hardware to be reused in the second LPAR system.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a method is provided to incorporate an existing system's hardware and partitions so that the existing hardware and partitions can be represented in a system planning tool in a way that enables the system planning tool to determine how to reuse or adapt the existing hardware and partitions within a new or revised system plan. The method of the present invention enables combining existing partitions and/or system hardware into a new or revised system plan for logical partition (LPAR) systems.

In accordance with features of the invention, a new concept in system planning and validation is provided that takes advantage of being able to extract and represent information about existing system hardware and partition configuration. The invention allows this information to be used in a planning session that can combine this information with a representation of a new system that is being built, for example, as in an upgrade to a new system, or being added to the representation of an existing system, for example, as in migration or consolidation. With this invention existing hardware and partitions are incorporated within a system planning and validation tool into a pallet of existing hardware and partitions. From this pallet the planning tool incorporates what is known about the system where this existing hardware and partitions is to be incorporated to first intelligently filter the items in the pallet. This allows the user of the planning tool of the present invention to be able to immediately know those partitions and hardware that can be accommodated on the new hardware.

In accordance with features of the invention, from the pallet, the user of the planning tool can now select to logically add the items on the pallet to the system being planned as part of their system planning session. Existing hardware taken from the pallet of existing hardware are automatically validated according to the placement rules known about the new hardware. Existing partitions can also be copied in from a pallet of existing partitions and their hardware resources and any required virtual resources, possibly required of other partitions, resolved in the planning session. As items are added into the system plan, they are consumed from the pallet of existing hardware or partitions. This allows the planner to immediately identify when existing resources are exhausted and might have to be supplemented with new resources that can then also be found by switching modes in the planning tool to allow the planning tool to create new partitions or select new hardware to complete the valid plan. The new items that are used in the planning session are identified so that they can be incorporated into a purchase order.

In accordance with features of the invention, the result of using the planning tool of the present invention is a validated plan in a file form that includes and identifies what is to be consolidated as well as any existing hardware or partitions where hardware or partitions are to be moved. If the system is an upgrade, a purchase order for the hardware that has to be obtained to complete the planned system, such as a new system unit, can be produced and submitted electronically. The resulting system plan file can be viewed or printed in a detailed format that can describe exactly those steps that will be required as part of the migration or upgrade including any system instructions to save or backup a system in order to move it or instructions identifying new software levels required to support it.

In accordance with features of the invention, existing system hardware used in the system plan descriptions includes the hardware serial numbers and physical locations of the hardware in the description so that when that actual hardware is to be moved, it will be easily located within the physical system and identified. In addition, information about how to move, for example, detach and remove from a physical slot location can be included in the resulting system plan. This feature of the invention allows hardware to be more easily reused to set up the system that has to be constructed before the resulting system plan is eventually deployed.

In accordance with features of the invention, the next major function provided by the invention is that the same system plan built and validated by the system planning session then is used in another stage, when the planned partitions are deployed on the managed system. The deployment of the system plan allows for the precise validation of the system plan content. For example, if existing hardware was to be moved and utilized in the resulting system, since the unique serial numbers of all the hardware are part of the plan, this invention enables the system to be checked to make sure that exact hardware is present on the system and diagnose when it is not. Since the location of the hardware is known as part of the plan, the diagnosing information advantageously includes how to locate and move the missing hardware required by the plan.

Figure 1:
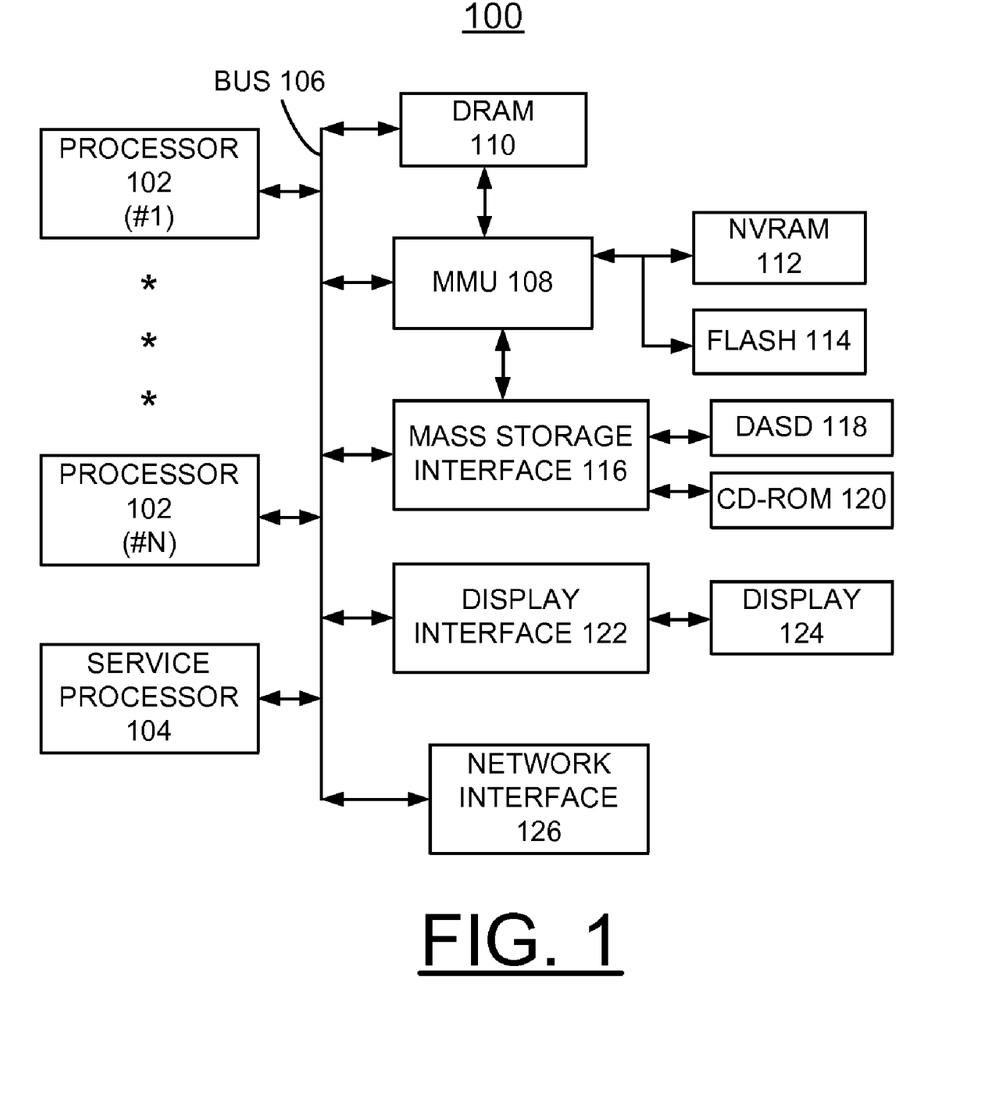
FIGS. 1 and 2 are block diagram representations illustrating an exemplary computer system and operating system for implementing importation and converging system definitions during planning phase for logical partition (LPAR) systems in accordance with the preferred embodiment.
Figure 2:
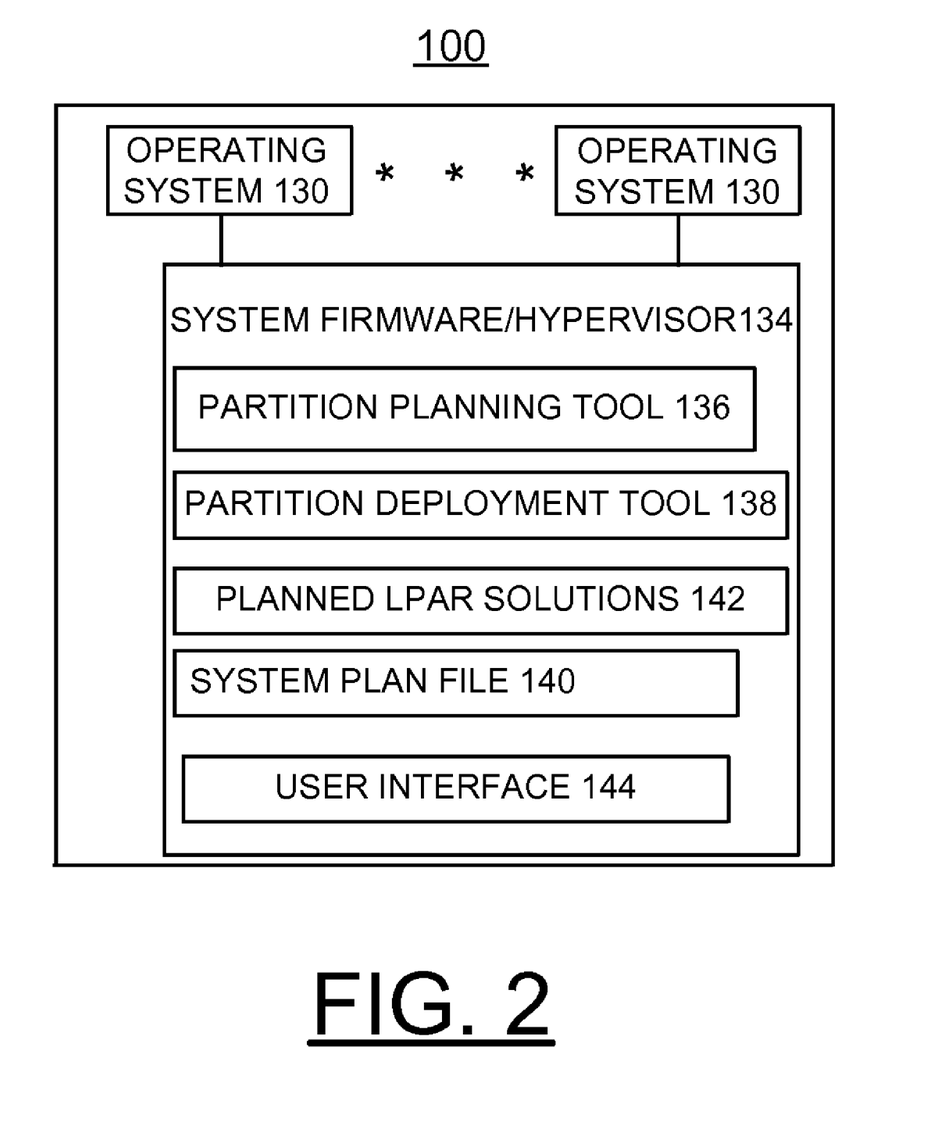

Referring now to the drawings, in FIGS. 1 and 2 there is shown an exemplary computer system generally designated by the reference character 100 for implementing methods for implementing importation and converging system definitions during planning phase for LPAR systems in accordance with the preferred embodiment. Computer system 100 includes a plurality of processors 102, #1-N or central processor units (CPUs) 102, #1-N and a service processor 104 coupled by a system bus 106 to a memory management unit (MMU) 108 and system memory including a dynamic random access memory (DRAM) 110, a nonvolatile random access memory (NVRAM) 112, and a flash memory 114. The system bus 106 may be private or public, and it should be understood that the present invention is not limited to a particular bus topology used. A mass storage interface 116 coupled to the system bus 106 and MMU 108 connects a direct access storage device (DASD) 118 and a CD-ROM drive 120 to the main processor 102. Computer system 100 includes a display interface 122 connected to a display 124, and a network interface 126 coupled to the system bus 106.

Computer system 100 is shown in simplified form sufficient for understanding the present invention. The illustrated computer system 100 is not intended to imply architectural or functional limitations. The present invention can be used with various hardware implementations and systems and various other internal hardware devices.

As shown in FIG. 2, computer system 100 includes a plurality of operating system 130, and a system firmware or hypervisor 134 of the preferred embodiment, a partition planning tool 136 of the preferred embodiment, a partition deployment tool 138 of the preferred embodiment, a system plan file 140 of the preferred embodiment, and a plurality of planned LPAR solutions 142 of the preferred embodiment and a user interface 144.

Figure 3:
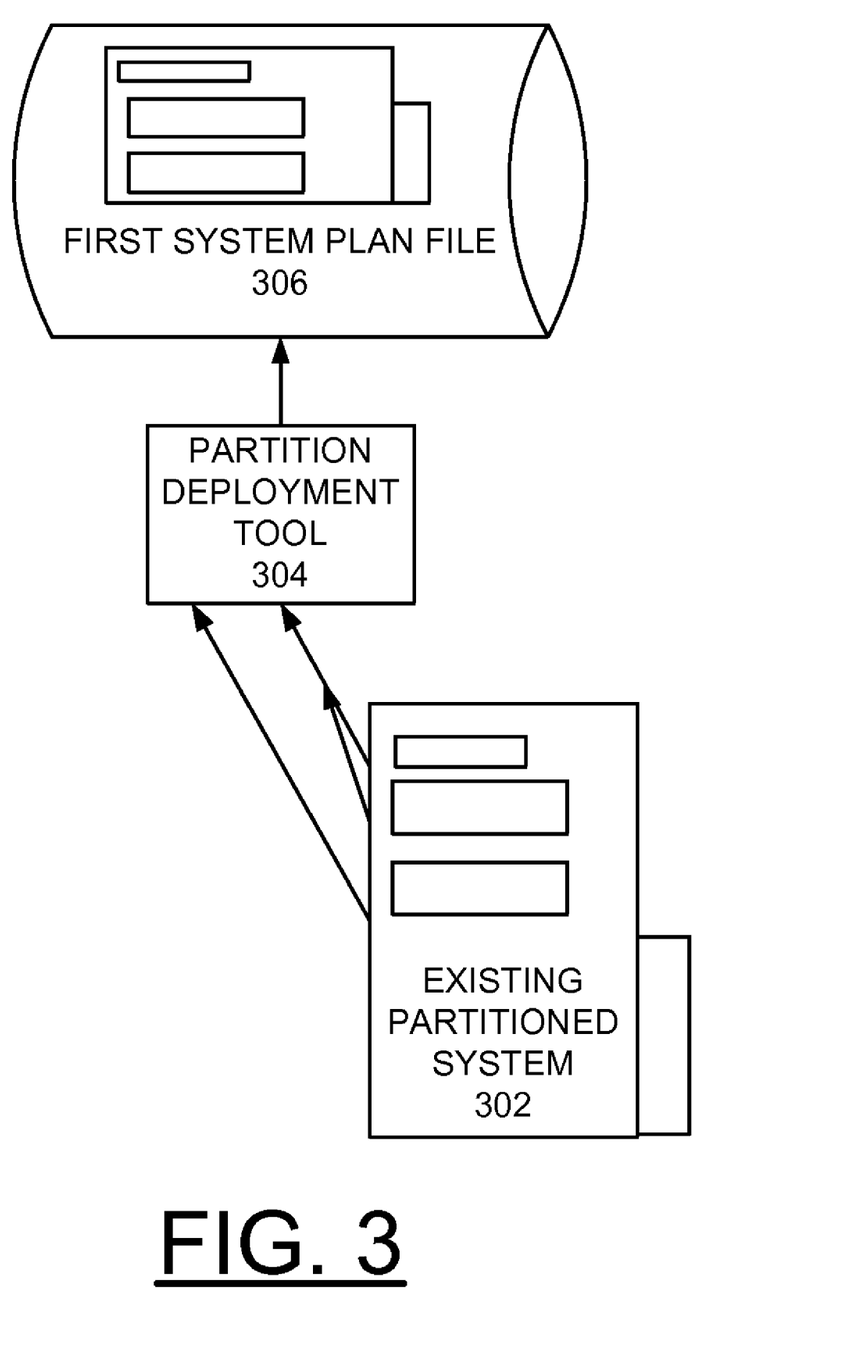
FIGS. 3, 4, 5, 6, 7, 8, 9 and 10 flow charts illustrating exemplary steps of methods for implementing importation and converging system definitions during planning phase for logical partition (LPAR) systems in accordance with the preferred embodiments.

Referring now to FIG. 3, there are shown exemplary steps of gathering of information about the hardware and partitions of an existing partitioned system as indicated at a block 302 that are to be moved or migrated to another system or incorporated in an upgrade to new hardware. This is made possible using the partition deployment tool 138 of the invention that can sense the existing system partitions and hardware as indicated at a block 304. This invention adds possible options to back up an existing system as part of gathering this information and the location information of the backed up system can be incorporated into the file built that represents this system. This information is all kept in a system plan file as indicated at a block 306 that is formatted to incorporate information about hardware and partitions that are deployed on that hardware on the existing partitioned system.

Figure 4:
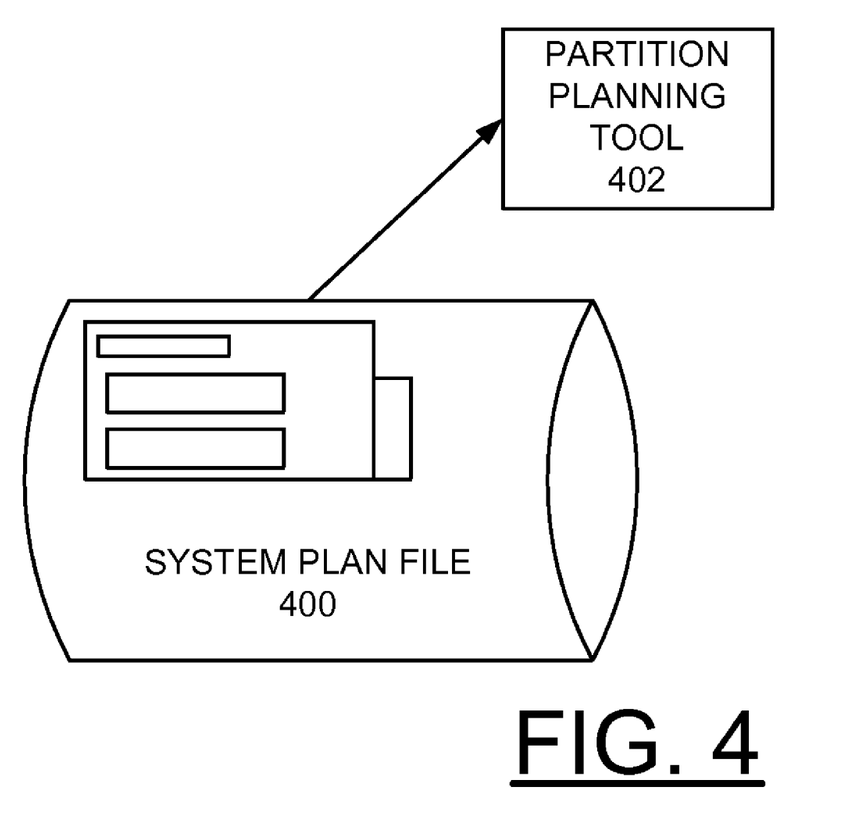

FIG. 4 shows a resulting system plan file as indicated at a block 400 that is being read into the planning tool 136 that incorporates this invention as part of planning for the migration or moving of a partition or an upgrade to a new or existing system as indicated at a block 402.

Figure 5:
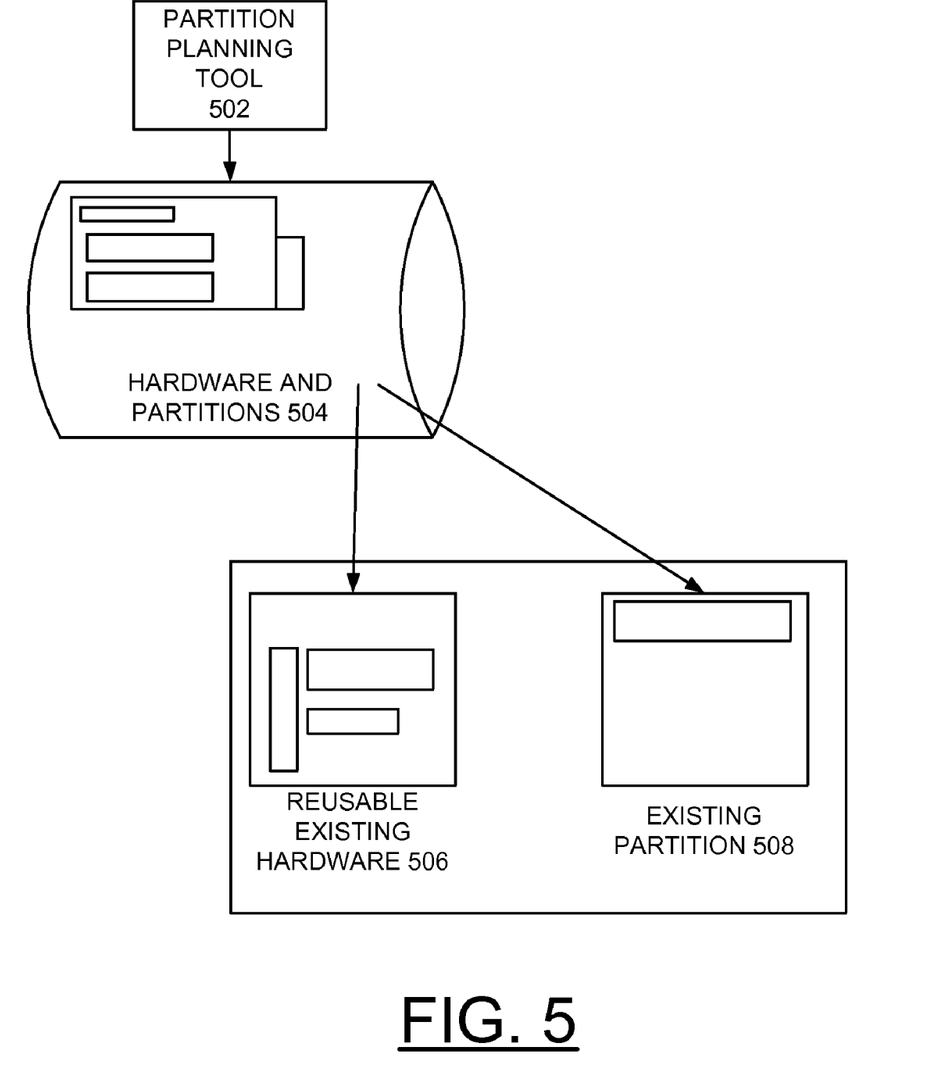

Referring now to FIG. 5, there are shown exemplary steps of the planning tool 136 as indicated at a block 502 building pallets as indicated at blocks 504, and 506 of hardware and partitions that are automatically filtered out based on what is compatible with the new system or upgraded existing system environment. The partition planning tool 136 is used to determine what of the system hardware described can possibly be reused as part of planning the new system or upgraded existing system. The partition planning tool 136 uses information about the existing partitions and the hardware and how the hardware and partitions are related. A filter is used to exclude hardware that is not supported or not reusable in the new system with information about existing partitions also used. This is possible as the planning tool already has information about the new or upgraded system and rules about the system hardware that can be used. These rules would normally be used in the system planning tool for new hardware placement when building a new system in the system planning tool. In this case however these same rules are used as part of the filter to exclude round tripped hardware not supported on the new or upgraded system.

Figure 6:
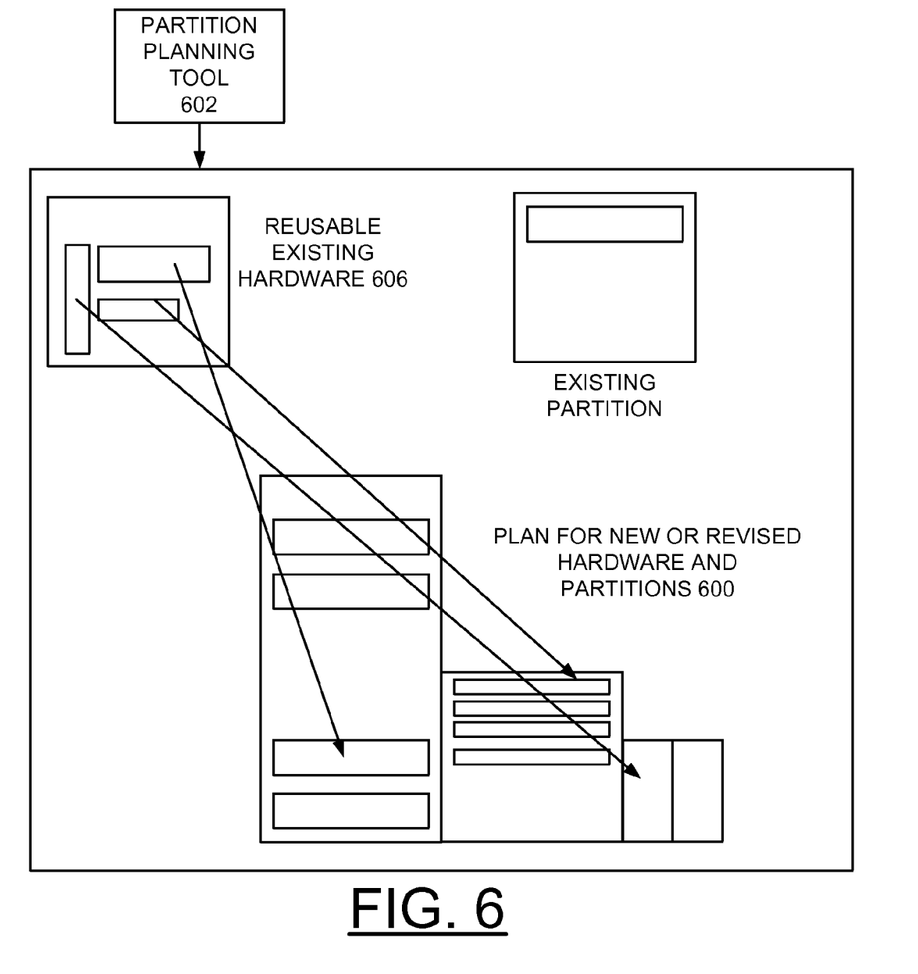

Referring now to FIG. 6, there are shown exemplary steps of the planning session in progress for new or revised hardware and partitions 600. The partition planning tool 136 as indicated at a block 602 uses the information of reusable existing hardware in the pallet 606 as part of planning for the migration or upgrade.

It should be understood that the invention allows for possible multiples of system plans to be gathered into formatted file objects and all read into the planning session at the same time. As each would be added, more items would be added to the pallets that represented the collective of valid hardware or partitions from all the systems represented by these files that are being combined into the system plan being built. The invention allows for the origin of all hardware or partitions to remain with the hardware or partitions that originated with each system so it is always known where the items incorporated into the new system plan originated. For example, the reusable existing hardware and existing partition in the pallets 606, 608 include identifying serial numbers that become part of the new plan 700 to identify the specific hardware part.

Figure 7:
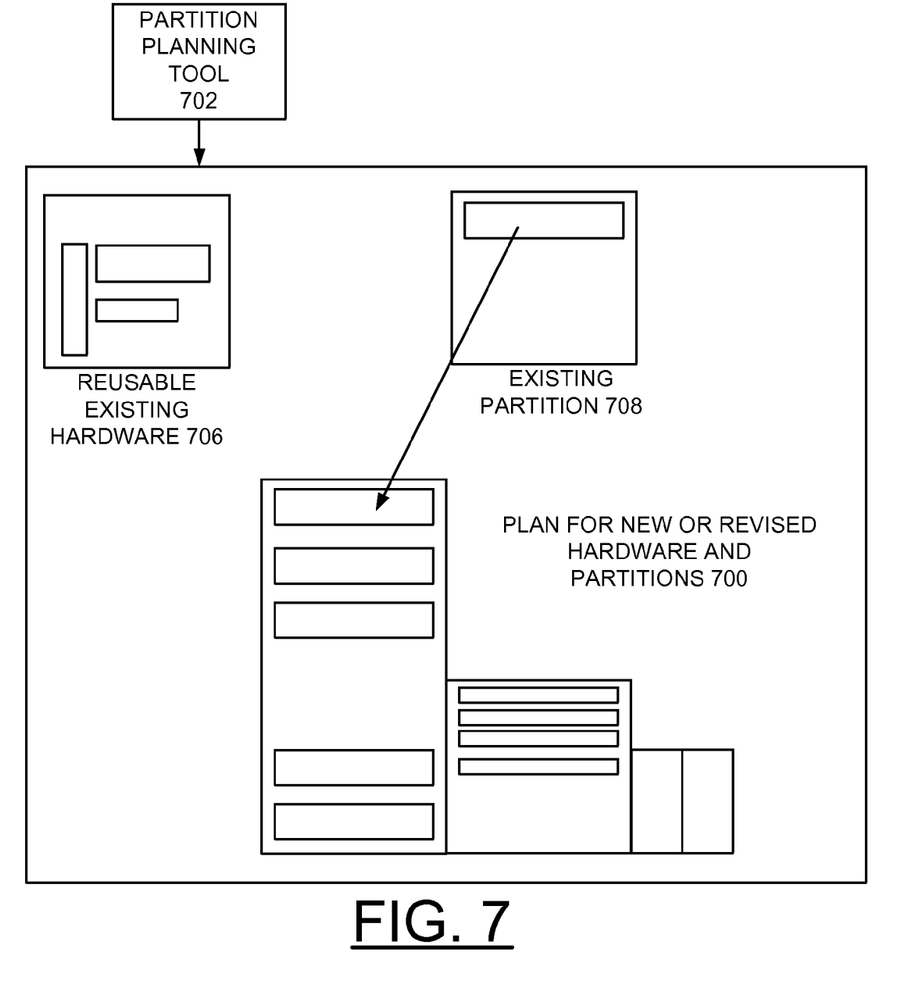

Referring now to FIG. 7, there are shown exemplary steps of the planning session in progress for a plan for new or revised hardware and partitions as indicated at a block 700. As indicated at a block 702 the partition planning tool 136 uses the information of existing partitions in the pallet 708 as part of planning for the migration or upgrade. Information about the existing partition location and how to migrate the partition information can be kept as part of the new system plan 700. As each and every reusable hardware part 706 or partition 708 is incorporated into the plan being built, it is validated according to the rules that are enforced by the planning tool 136. Also other configurable, new hardware or partitions can also be added as part of this planning session in order to fill in the gaps or to incorporate additional or new technology into the resulting planned system.

Figure 8:
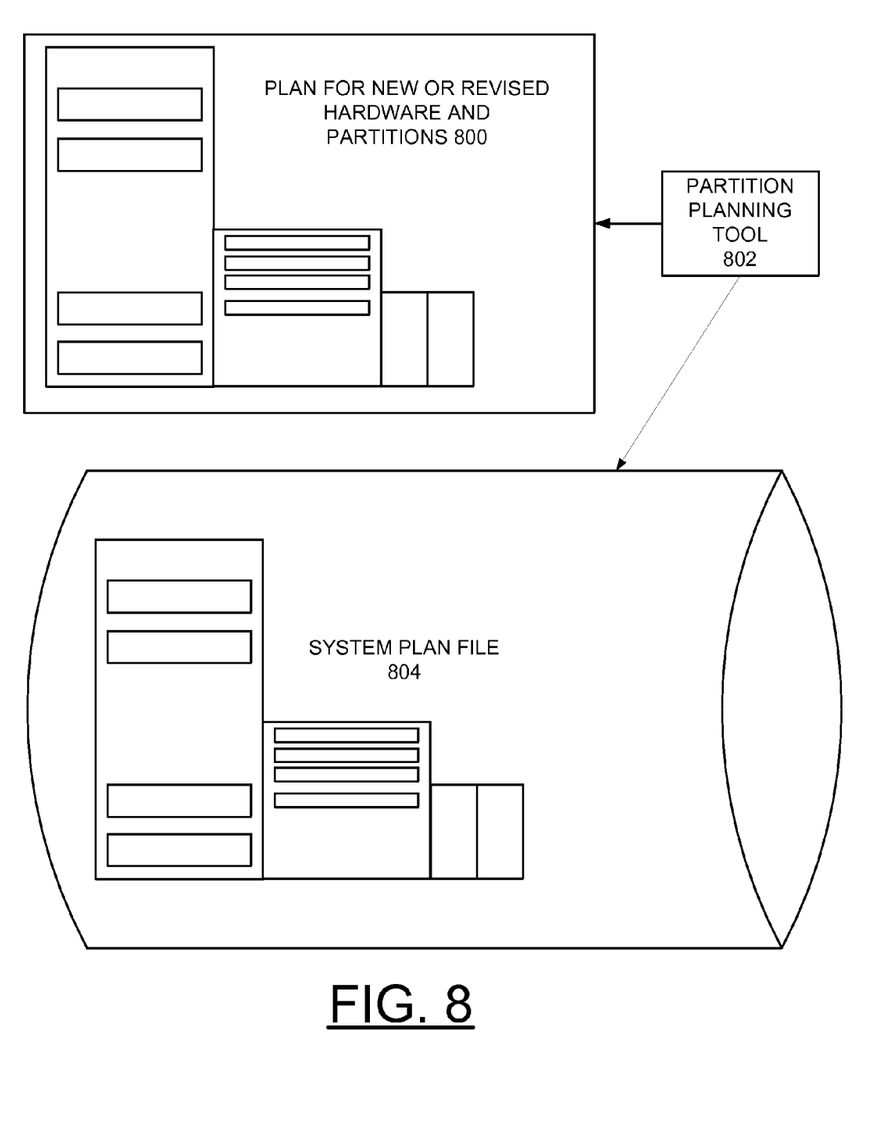

Referring now to FIG. 8, there are shown exemplary steps used to revise the planned layout of partitions, hardware and how they are related as indicated at a block 800 by the of the planning tool 136 as indicated at a block 802. The system planning tool 136 assures that the partitions are valid and will function on the hardware image defined. A validated system plan as indicated at a block 804 is created or revised by an output of the planning session. The system plan file 804 can be saved into a new deployment plan that incorporates information called out by earlier steps where this invention is used. The resulting file can be used as part of the deployment phase of this plan or as input into other tools that can produce instructions how to back up and save system if that was not already done. Since the original systems plans that might have contributed hardware in the new system plan include information such as the serial numbers and physical location of the hardware used, this information can be used to produce a set of instructions as to how to locate and move this hardware and where it should be placed according to the new system plan 804. If the resulting system incorporates new hardware, a purchase order can be produced from the plan to obtain this hardware.

Figure 9:
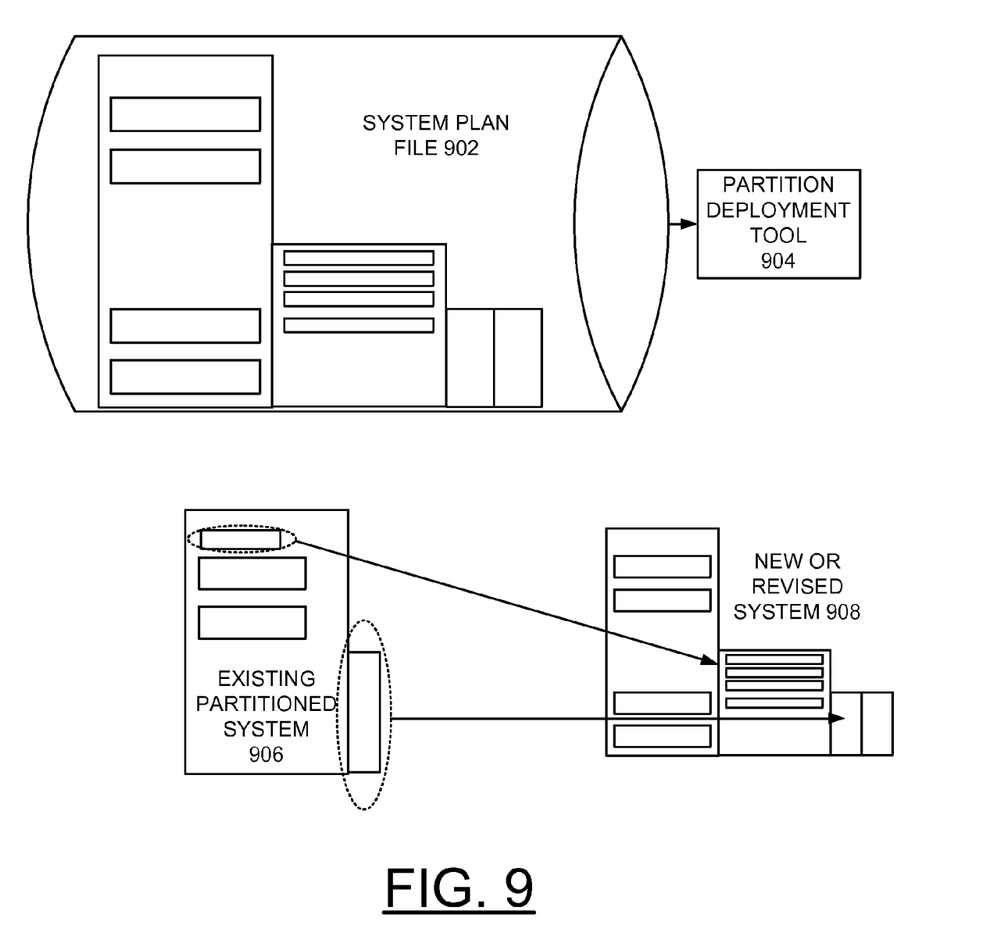

Referring now to FIG. 9, there are shown exemplary steps for the system plan as indicated at a block 902 being read into a deployment tool 138 that incorporates the present invention and uses the file information produced in the planning session to do the necessary work to make the upgrade. Hardware of the existing partitioned system as indicated at a block 906 is relocated to the new or revised system as indicated at a block 908 as required by the system plan file 902.

Figure 10:
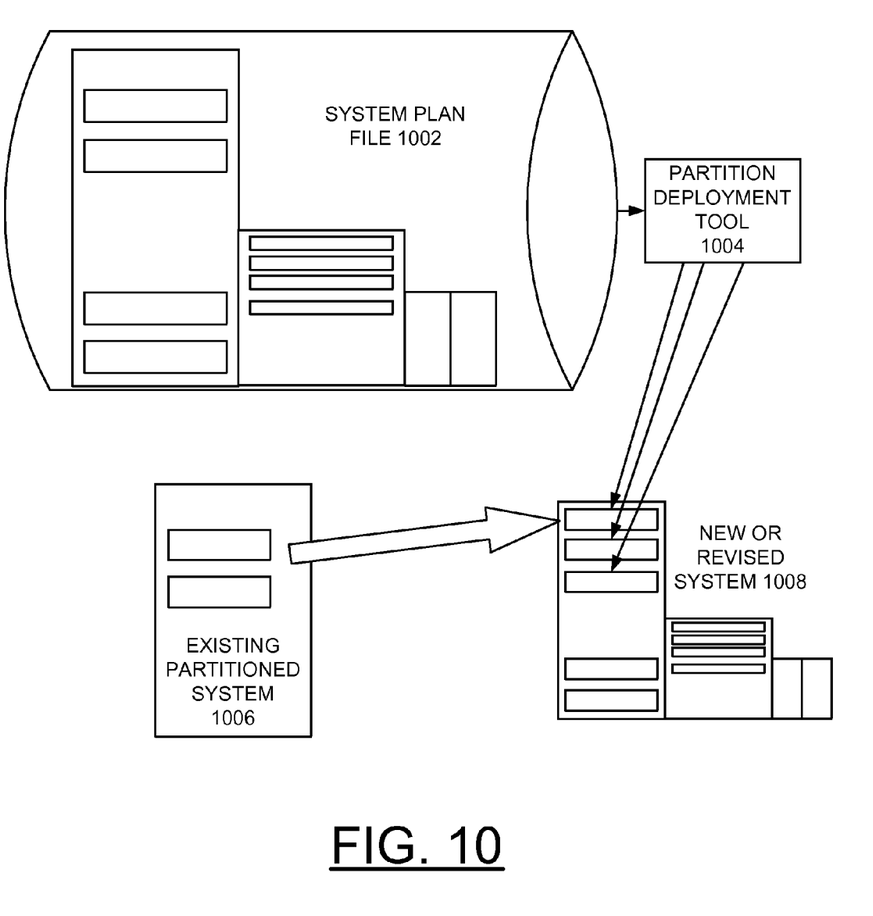

Referring now to FIG. 10, there are shown exemplary steps for the system plan as indicated at a block 1002 being read into a deployment tool 138 as indicated at a block 1004. The deployment tool 138 is enabled by the present invention which include the validation that any existing hardware from the existing partitioned system as indicated at a block 1006 to be reused as part of deploying to a new system as indicated at a block 1008 is actually present on that system 1006. Diagnostic information about what was not found as well as how to locate and obtain that hardware can be produced at this stage. The invention also incorporates that if information about where a system has been backed up is part of the system plan, that this backed up image of the system can be located. The deployment tool can produce that system's partition container precisely according how it appears in the validated plan and the backup of that system used to load the system into that partition to complete it's migration to that new partition on the new system where the plan is being deployed.

Figure 11:
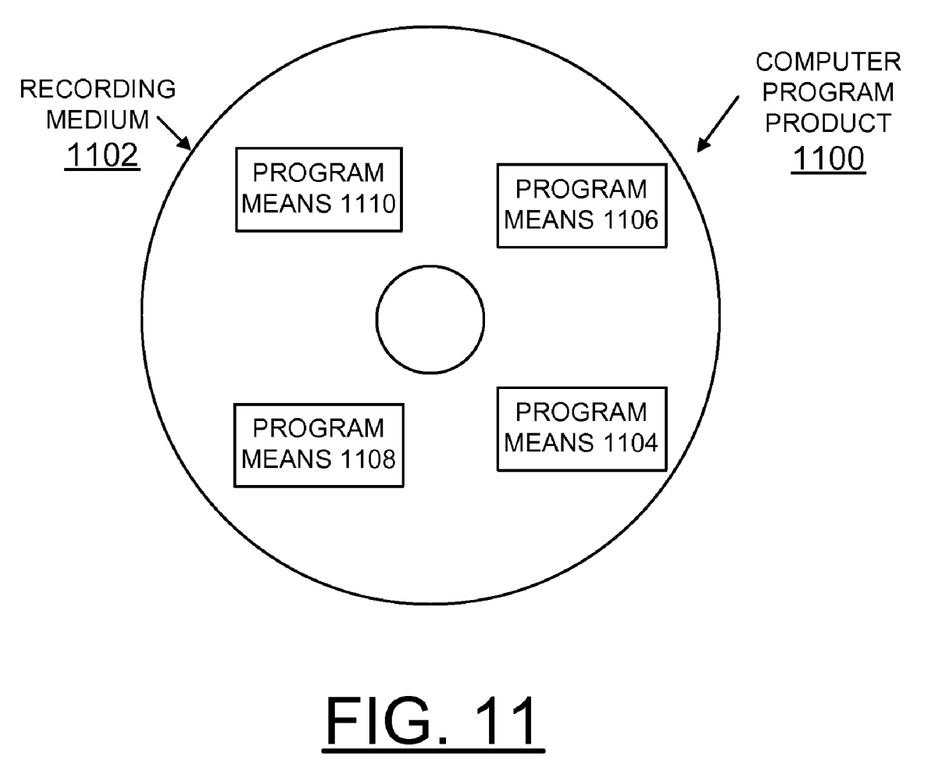
FIG. 11 is a block diagram illustrating a computer program product in accordance with the preferred embodiment.

Referring now to FIG. 11, an article of manufacture or a computer program product 1100 of the invention is illustrated. The computer program product 1100 includes a recording medium 1102, such as, a floppy disk, a high capacity read only memory in the form of an optically read compact disk or CD-ROM, a tape, a transmission type media such as a digital or analog communications link, or a similar computer program product. Recording medium 1102 stores program means 1104, 1106, 1108, 1110 on the medium 1102 for carrying out the methods for implementing importation and converging system definitions during planning phase for logical partition (LPAR) systems of the preferred embodiment in the system 100 of FIGS. 1 and 2.

A sequence of program instructions or a logical assembly of one or more interrelated modules defined by the recorded program means 1104, 1106, 1108, 1110, direct the computer system 100 for implementing LPAR planning methods of the preferred embodiment.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

While the present invention has been described with reference to the details of the embodiments of the invention shown in the drawing, these details are not intended to limit the scope of the invention as claimed in the appended claims.

What is claimed is:

1. A computer-implemented method for implementing importation and converging system definitions during planning phase for logical partition (LPAR) systems comprises the steps of:
    gathering hardware and partition information of an existing LPAR system and storing the collected hardware and partition information in a first system plan file;
    applying said first system plan file to a partition planning tool; and
    said partition planning tool identifying hardware to be reused in a second LPAR system,
    said partition planning tool filtering hardware to be excluded from said second LPAR system;
    said partition planning tool creating a plan for said second LPAR system using said identified hardware to be reused;
    said partition planning tool creating said plan for said second LPAR system includes using information of said partitions of said existing LPAR system; and identifying partitions to be supported on said second LPAR system;
    said partition planning tool creating said plan for said second LPAR system includes validating hardware using predefined placement rules; and
    applying said created plan for said second LPAR system to a partition deployment tool to partition said second LPAR system; said created plan for said second LPAR system used to move and place hardware to be reused in said second LPAR system.

2. The computer-implemented method as recited in claim 1 wherein said partition planning tool creating said plan for said second LPAR system includes copying a plan description of said identified partitions to be supported on said second LPAR system.

3. The computer-implemented method as recited in claim 1 wherein said partition planning tool creating said plan for said second LPAR system includes creating new partitions on said second LPAR system.

4. The computer-implemented method as recited in claim 1 further includes said partition planning tool receiving user selections for existing hardware to be added to said second LPAR system.

5. The computer-implemented method as recited in claim 1 further includes said partition planning tool receiving user selections for new hardware to be added to said second LPAR system.

6. The computer-implemented method as recited in claim 1 wherein storing said collected hardware and partition information in said first system plan file includes storing hardware serial numbers and physical location of the hardware in a system definition in said first system plan file.

7. The computer-implemented method as recited in claim 1 wherein said collected hardware and partition information in said first system plan file is included in said created plan for said in said second LPAR system and used to move and place hardware to be reused in said second LPAR system.

8. The computer-implemented method as recited in claim 1 wherein said second LPAR system includes an existing system being upgraded; and wherein said partition planning tool filtering hardware to be excluded from said second LPAR system uses common hardware placement rules used for planning a new system.

9. An apparatus for implementing importation and converging system definitions during planning phase for logical partition (LPAR) systems comprising:
    a partition deployment tool for gathering hardware and partition information of an existing LPAR system and storing the collected hardware and partition information in a first system plan file;
    a partition planning tool receiving said first system plan file; said partition planning tool identifying hardware to be reused in a second LPAR system, said partition planning tool filtering hardware to be excluded from said second LPAR system; said partition planning tool creating a plan for said second LPAR system using said identified hardware to be reused and using information of said partitions of said existing LPAR system; said partition planning tool identifying partitions to be supported on said second LPAR system; said partition planning tool creating said plan for said second LPAR system includes validating hardware using predefined placement rules; and
    a partition deployment tool receiving said created plan for said second LPAR system, and partitioning said second LPAR system; said created plan for said second LPAR system being used to move and place hardware to be reused in said second LPAR system.

10. The apparatus as recited in claim 9 wherein said partition planning tool creating said plan for said second LPAR system includes copying a plan description of said identified partitions to be supported on said second LPAR system.

11. The apparatus as recited in claim 9 wherein said partition planning tool creating said plan for said second LPAR system includes said partition planning tool receiving user selections for existing hardware to be added to said second LPAR system.

12. The apparatus as recited in claim 9 wherein said partition planning tool creating said plan for said second LPAR system includes said partition planning tool receiving user selections for new hardware to be added to said second LPAR system.

13. The apparatus as recited in claim 9 wherein said partition planning tool creating said plan for said second LPAR system includes said partition planning tool storing hardware serial numbers and physical location of the hardware in a system definition in said first system plan file.

14. The apparatus as recited in claim 9 wherein said partition planning tool creating said plan for said second LPAR system includes said partition planning tool using said created plan for said second LPAR system for generating instructions for moving identified hardware to be reused in said second LPAR system.

15. A computer-readable medium encoded with a computer program product for implementing importation and converging system definitions during planning phase for logical partition (LPAR) systems in a computer system, said computer-readable medium consisting one of a floppy disk, a hard disk, a high capacity read only memory in the form of an optically read compact disk or CD-ROM, a DVD, a tape, a read only memory (ROM), and a random access memory (RAM), said computer program product including instructions executed by the computer system to cause the computer system to perform the steps of:

gathering hardware and partition information of an existing LPAR system and storing the collected hardware and partition information in a first system plan file;

applying said first system plan file to a partition planning tool; and said partition planning tool identifying hardware to be reused in a second LPAR system, said partition planning tool filtering hardware to be excluded from said second LPAR system;

said partition planning tool creating a plan for said second LPAR system using said identified hardware to be reused;

said partition planning tool creating said plan for said second LPAR system includes using information of said partitions of said existing LPAR system; and identifying partitions to be supported on said second LPAR system;

said partition planning tool creating said plan for said second LPAR system includes validating hardware using predefined placement rules; and applying said created plan for said second LPAR system to a partition deployment tool to partition said second LPAR system; said created plan for said second LPAR system used to move and place hardware to be reused in said second LPAR system.

16. The computer-readable medium encoded with a computer program product for implementing importation and converging system definitions during planning phase for logical partition (LPAR) systems as recited in claim 15 includes copying a plan description of said identified partitions to be supported on said second LPAR system.

17. The computer-readable medium encoded with a computer program product for implementing importation and converging system definitions during planning phase for logical partition (LPAR) systems as recited in claim 15 includes creating new partitions on said second LPAR system.

18. The computer-readable medium encoded with a computer program product for implementing importation and converging system definitions during planning phase for logical partition (LPAR) systems as recited in claim 15 includes said partition planning tool receiving user selections for existing hardware to be added to said second LPAR system.

19. The computer-readable medium encoded with a computer program product for implementing importation and converging system definitions during planning phase for logical partition (LPAR) systems as recited in claim 15 includes storing hardware serial numbers and physical location of the hardware in a system definition in said first system plan file.

20. The computer-readable medium encoded with a computer program product for implementing importation and converging system definitions during planning phase for logical partition (LPAR) systems as recited in claim 19 wherein said stored hardware serial numbers and physical location of the hardware in said system definition in said first system plan file is included in said created plan for said second LPAR system and is used to move and place hardware to be reused in said second LPAR system.

* * * * *